C. BRAULT.
BALL OR ROLLER BEARING.
APPLICATION FILED APR. 13, 1915.
1,179,693.
Patented Apr. 18, 1916.
2 SHEETS—SHEET 1.
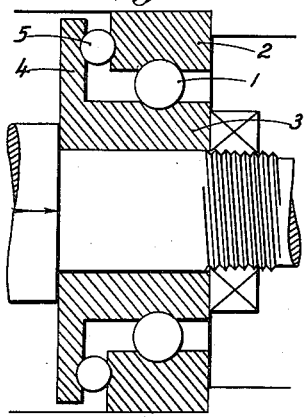
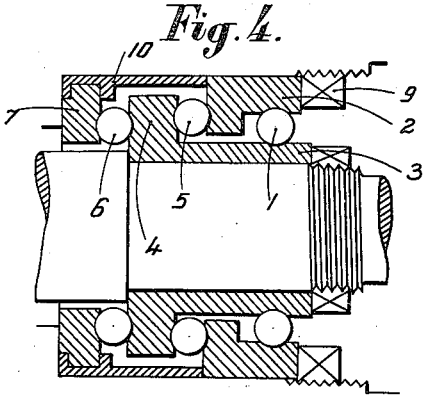
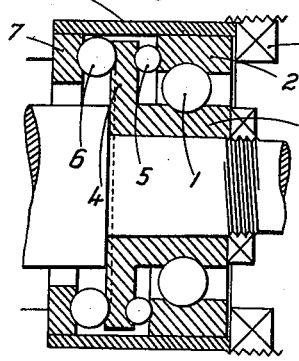
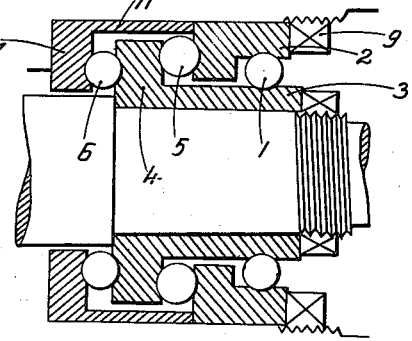
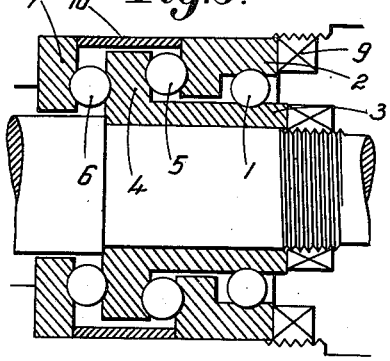
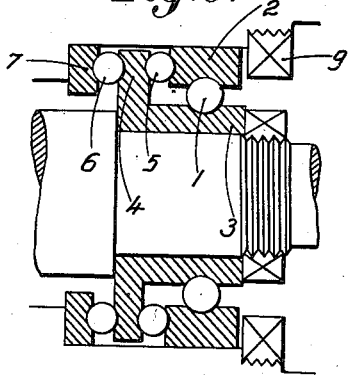
Inventor.
Camille Brault
by Henri Goldsborough & Meili
Attys

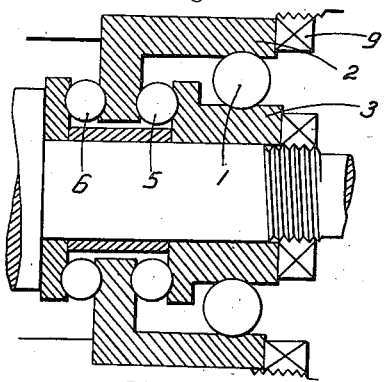
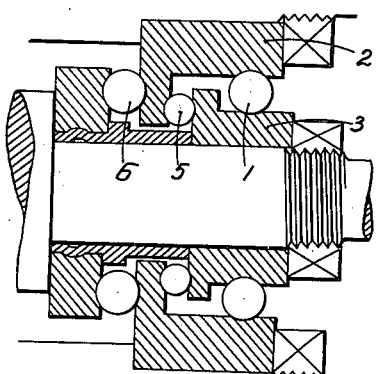
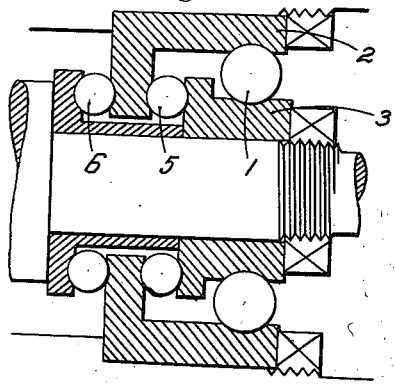

UNITED STATES PATENT OFFICE.

CAMILLE BRAULT, OF CLICHY, SEINE, FRANCE, ASSIGNOR TO THE SOCIETE DE MECANIQUE DE PRECISION, OF CLICHY, SEINE, FRANCE.

BALL OR ROLLER BEARING.

1,179,693.  Specification of Letters Patent.  Patented Apr. 18, 1916.

Application filed April 13, 1915. Serial No. 21,019.

*To all whom it may concern:*

Be it known that I, CAMILLE BRAULT, citizen of the French Republic, residing at Clichy, Department of the Seine, in France, have invented certain new and useful Improvements in or Relating to Ball or Roller Bearings; and I do hereby declare the following to be a full, clear, and exact description of the invention, such as will enable others skilled in the art to which it appertains to make and use the same.

This invention consists in a ball or roller bearing comprising a double thrust collar.

It is well known that when an ordinary ball bearing is exposed to thrust in the axial direction, it is necessary to add to it ball thrust bearings. So called "duplex" bearings have also been designed for the special case in which the axial thrust acts only in one direction, the said bearings being constituted by an annular ball bearing and a thrust bearing or collar, the series of balls of which are mounted between a flat shoulder secured to one of the rings, and the flat annular surface of the second.

The present invention comprises a device whereby such bearings are enabled to resist axial thrusts in both directions. To that end, back to back with the "duplex" bearing is arranged a ball thrust collar resting, on the one hand, in the groove of a special thrust disk, and on the other hand, in a groove provided on the outer face of the shoulder of the "duplex" bearing. The ball bearing with double thrust collar thus obtained is therefore characterized by a "duplex" bearing combined with a ball thrust bearing or collar, one of the disks of which is constituted by the "duplex" bearing itself.

The invention comprises moreover certain arrangements, such as the erecting of the whole of the "duplex" bearing and of the thrust bearing, in a socket or sleeve as will be more fully described in the following.

Figure 1 shows, by way of example, a "duplex" type bearing. Fig. 2 shows a "duplex" bearing combined with a ball thrust bearing, according to this invention, the various parts being coupled together by a single sleeve. Figs. 3–6 show various devices for avoiding the crushing of the thrust balls when the whole of the bearing and of the thrust collar is not supported by a single sleeve. Figs. 7–9 show examples of the foregoing arrangement in the case in which the "duplex" bearing is of a slightly modified type, in which the thrust collar is secured to the outer ring of the bearing.

The "duplex" bearing shown in Fig. 1 comprises a ring of balls 1 arranged between an outer ring 2 and an inner ring 3 in one piece with a thrust shoulder or collar 4. A ring of balls 5 is placed between the inner face of the collar or shoulder 4, and the opposite face of the outer ring 2. The bearing thus constituted, can receive axial thrusts applied to the shaft in the direction of the arrow. In order to enable it to receive axial thrust in the two directions, a thrust bearing is provided, constituted in the following manner (Figs. 2 and 3): a ring of balls 6 is arranged between the outer face of the collar 4 of the "duplex" bearing and a thrust-collar 7. The ball races could obviously be provided in the outer face of the collar 4 and in the washer 7. It will thus be seen that the axial thrusts on the bearing are absorbed either by the ring of balls 5, or by the ring of balls 6. As shown in Fig. 2, the "duplex" bearing and the thrust bearing added to it, could be mounted in the interior of a sleeve 8. In that case, it is necessary that the length of the sleeve should exceed by a few tenths of a millimeter the thickness of the "duplex" bearing and of the thrust bearing, so that the balls of the thrust rings should not be crushed when the nut 9 securing the bearing in its recess, is tightened.

In the construction shown in Fig. 3, the crushing of the thrust balls is avoided by a ring 10 forming a stay arranged between the "duplex" bearing and the thrust washer. Fig. 4 shows a modified construction, in which the thrust washer is inset in the stay-ring 10. In the method of erecting shown in Fig. 5, the trust washer and the stay are made in one piece 11. Finally, in the arrangement shown in Fig. 6, the stay maintaining the distance between the thrust washer and the "duplex" bearing, is done away with, and the recess must then be provided with a shoulder, against which the tightening nut bears.

Figs. 7 to 9 show examples of a double thrust bearing according to this invention, in the case in which the "duplex" bearing, different from the construction shown in Fig. 1, comprises a thrust collar in one piece with the outer ring of the bearing.

It is obvious that all the preceding arrangements are applicable to roller bearings as well as to ball bearings.

Having now particularly described and ascertained the nature of my said invention and in what manner the same is to be performed, I declare that what I claim is:—

A ball bearing comprising two annular race members having one pair of opposing grooved horizontal surfaces and one pair of opposing grooved vertical surfaces, a row of balls positioned between the surfaces of each of said pairs, a third race member having a vertical surface facing a vertical surface on one of said first-named race members, and a third row of balls between said last-named surfaces, said annular race members together with the balls positioned therebetween being removable as a unit from association with the said third race member and the third row of balls.

In testimony whereof I affix my signature in presence of two witnesses.

C. BRAULT.

Witnesses:
  HENRI COHER,
  DENNIS C. POOLE, Jr.